United States Patent Office 3,483,213
Patented Dec. 9, 1969

3,483,213
TETRAHALOGENO ISOINDOLINE PIGMENTS
André Pugin, Riehen, Kurt E. Burdeska, Basel, and Alfred Staub, Binningen, Basel-Land, Switzerland, assignors to J. R. Geigy A.G., Basel, Switzerland
No Drawing. Continuation-in-part of application Ser. No. 451,606, Apr. 28, 1965. This application Mar. 22, 1968, Ser. No. 715,143
Claims priority, application Switzerland, Apr. 30, 1964, 5,665/64
Int. Cl. C09b 57/00; C07d 27/48; C08g 51/14
U.S. Cl. 260—326.1                                    6 Claims

ABSTRACT OF THE DISCLOSURE

The invention is directed to pigments of the formula

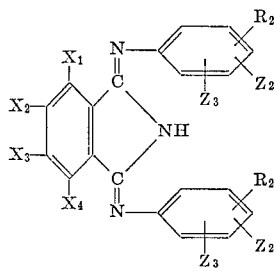

wherein each of $X_1$, $X_2$, $X_3$ and $X_4$ is a member selected from the group consisting of chlorine and bromine, $R_2$ represents certain acylamino, alkoxycarbonylamino or ureido radicals $Z_2$ is hydrogen, chlorine, bromine, lower alkyl, lower alkoxy, phenoxy, chlorophenoxy bromophenoxy or lower alkylphenoxy and $Z_3$ is hydrogen, chlorine or lower alkoxy, useful for colouring high molecular weight organic materials; the pigmented materials are distinguished by good resistance to solvents and good fastness to light, to cross-lacquering and to migration.

---

This application is a continuation-in-part of our pending patent application Ser. No. 451,606 filed Apr. 28, 1965, now U.S. Patent No. 3,385,864.

DETAILED DISCLOSURE

The present invention concerns new pigments for colouring high molecular organic products.

The invention also concerns, as industrial product, the colored high molecular, organic material.

"High molecular organic substances" which can be pigmented according to the invention and which are understood by this term as used in this specification, can be of natural or synthetic origin and are, in particular, natural resins, drying oils or rubber, furthermore modified natural substances, e.g. chlorinated rubber, oil-modified alkyl resins or cellulose derivatives such as viscose, acetyl cellulose and nitrocellulose and, particularly, completely synthetic organic polymeric materials, i.e. plastics produced by polymerization, polycondensation and polyaddition. The following can be named in particular from this class of plastics: polyethylene, polypropylene, polystyrene, polyvinyl chloride, polyvinyl acetate, polyacrylonitrile, polyacrylic acid ester and polymethacrylic acid ester; polyesters, in particular high molecular esters of aromatic polycarboxylic acids with polyfunctional alcohols; polyamides; the condensation products of formaldehyde with phenols, the phenolic resins, and the condensation products of formaldehyde with urea, thiourea and melamine, the so-called amino plastics; the polyesters used as lacquer resins, both saturated such as alkyl resins as well a unaturated such as maleinate resins, and also the polyaddition or polycondensation products of epichlorohydrin with diols or polyphenols known by the name of "epoxy resins"; in addition the so-called thermoplastics, i.e. polymeric materials which cannot be cured. Not only the uniform compounds but also mixtures of polymeric materials as well as mixed condensates and mixed polymers such as those based on butadiene can be pigmented according to the invention.

The pigmenting of such high molecular organic substances with 1,3-bis-arylimino-isoindolines the arylimino groups of which are derived from certain heterocyclic amines namely benzothiazoles, benzoxazoles and benzimidazoles, is known. But the color strength and the fastness properties of these pigmentations, in particular the fastness to solvents, cross lacquering, migration and light are not up to present day standards. Also these 1,3-bis-arylimino-isoindolines having a heterocyclic aryl radical have the disadvantage that on trituration with zinc oxide they undergo a noticeable change in shade which change is proportional to the length of the trituration. These undesirable properties are also present in the case of using pigments obtained from those of the above-mentioned class by halogenation in the 4-, 5-, 6- and 7-position of the isoindoline ring.

Furthermore, it has been found that the 1,3-bis-phenyl-imino-isoindolines used as intermediate products for the synthesis of phthalocyanine dyestuffs, the benzo radical of the isoindoline ring of which is unsubstituted, suffer from drawbacks which make them unsuited as pigments; in particular they lack fastness to light and solvents and possess only slight color strength even if the phenylimino groups thereof bear nonionogenic ring substituents. Their color strength is even lower than that of the 1,3-bis-aryl-imino-isoindolines containing heterocyclic arylimino groups.

It could be concluded from these facts that the pigmentings of high molecular organic substances with 4,5,6,7-tetrahalogen-1,3-bis-phenylimino-isoindolines the phenyl radicals of which are neither non-iongenically substituted nor condensed, would have hardly better properties than pigmentings with such compounds the benzo radical of the isoindoline ring of which is not halogenated.

It has now been found that contrary to this expectation high molecular organic products can be pigmented with surprising fastness and color strength by incorporating into the same a colored compound of the formula

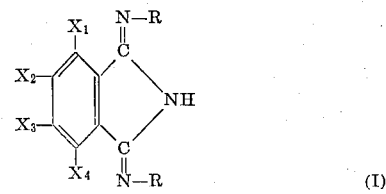

(I)

wherein each of $X_1$, $X_2$, $X_3$ and $X_4$ represents chlorine or bromine and R represents an unsubstituted, a non-ionogenically substituted or a condensed phenyl radical.

The tautomeric Formula Ia can also be assigned to the compounds of the Formula I, and all formulae analogous to Formula I are to be understood as including the tautomers analogous to Formula Ia:

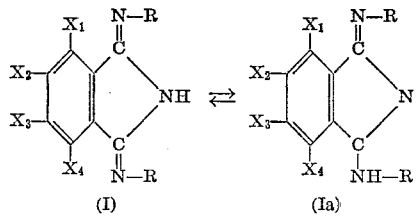

(I)   (Ia)

If R in Formula I is a non-ionogenically substituted phenyl radical then examples of substituents are: halogens such as fluorine, chlorine or bromine; lower alkyl groups such as the methyl, ethyl or butyl group; the trifluoromethyl group; aryl groups such as the phenyl group and non-ionogenically substituted phenyl groups; lower alkoxy groups, e.g. the methoxy, ethoxy or butoxy group; aralkoxy groups such as the benzyloxy group, or aryloxy groups such as the phenoxy, methylphenoxy or halogenphenoxy groups; sulphonic acid amide and carboxylic acid amide groups optionally substituted at the nitrogen atom, which nitrogen substituents may be aliphatic groups, in particular lower alkyl, hydroxyalkyl, halogenalkyl or cyanoalkyl groups, cycloaliphatic or aromatic groups; also sulfonic acid aryl ester, particularly phenyl ester or cresyl ester groups; carboxylic acid ester groups; acyl groups, i.e. carbacyl groups, e.g. lower alkanoyl groups such as the acetyl or propionyl group, aroyl groups such as the benzoyl, methylbenzoyl and chlorobenzoyl groups, alkylsulfonyl groups such as the methylsulfonyl, ethylsulfonyl or butylsulfonyl group, or arylsulfonyl groups such as the phenylsulfonyl, methylphenylsulfonyl or chlorophenylsulfonyl group; the cyano group and finally the acylamino groups, particularly carbacylamino, alkoxycarbonylamino, cycloalkoxycarbonylamino, aralkoxycarbonylamino, optionally nitrogen-substituted ureido, or dicarboxylic acid amido groups. Mainly, aroylamino groups are used as carbacylamino groups, for example, benzoylamino or naphthoyl-(1 or 2)-amino groups the rings of which can be non-ionogenically substituted, e.g. by halogen, lower alkyl or lower alkoxy groups. The methoxy- and ethoxycarbonylamino groups are suitable as alkoxycarbonylamino groups, the cyclohexyloxycarbonylamino group is mentioned as cycloalkoxycarbonylamino group and, as example of an aralkoxycarbonylamino group, the benzyloxycarbonylamino group is mentioned. Nitrogen-substituted ureido groups preferably correspond to the formula —HN—CO—NH—R' wherein R' is an aromatic group, mainly a phenyl radical optionally substituted by halogen, lower alkoxy or lower alkyl groups. Dicarboxylic acid imido groups are derived from e.g. succinic acid, phthalic acid, chlorinated phthalic acid, hexahydrophthalic acid, 1,4 - endomethylene-hexahydrophthalic acid, naphthalic acid, or from pyridine dicarboxylic acid.

If R is a condensed phenyl radical, then the aminobenzo component can complete both carbocyclic as well as heterocyclic structures.

Preferably both R's are identical non-ionogenically substituted phenyl radicals. The expression "non-ionogenically substituted," whenever appearing in the invention description is used to designate that compounds or radicals are substituted by groups which do not dissociate acid in neutral water.

Pigments according to the invention which afford especially in paints and lacquers, e.g. for use in the automobile industry, pigmented products of good resistance to solvents and good fastness to light, to cross-lacquering and to migration, comprise those pigments falling under Formula I in which R represents a carbacylamido-phenyl radical of the formula

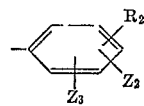

wherein $R_2$ represents lower alkanoylamino, lower alkoxycarbonylamino, benzoylamino, chloro-benzoylamino, bromobenzoylamino, lower alkyl-benzoylamino, lower alkoxybenzylamino, phthalimido, chloro-phthalimido, a phthalimido-phenyl radical any substituent of which is selected from chlorine, lower alkyl and lower alkoxy, succinimido, pyridine-dicarboximido, ureido, N-lower alkyl-ureido, an N-phenyl-ureido radical optionally substituted at the phenyl moiety, any substituent of the latter being selected from chlorine, bromine, lower alkyl and lower alkoxy.

$Z_2$ represents hydrogen, chlorine, bromine, lower alkyl, lower alkoxy, phenoxy, chlorophenoxy, bromophenoxy or lower alkyl-phenoxy, and $Z_3$ represents hydrogen, chlorine and lower alkoxy.

Preferred are those pigments in which $R_2$ represents an aroylamino group the aryl radical of which contains chlorine, or a dicarboxylic acid imido group, especially a phthaloylimido group.

4,5,6,7-tetrahalogen-isoindolines usable according to the invention and falling under Formula I wherein R is a non-ionogenically substituted or condensed phenyl radical and $X_1$, $X_2$, $X_3$ and $X_4$ each represents chlorine or bromine, are obtained by reacting a compound of the formula

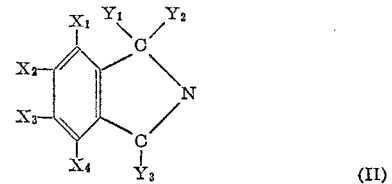

(II)

wherein each of $Y_1$, $Y_2$ and $Y_3$ represents a monovalent reactive substituent and $Y_1$ and $Y_2$ together also represent a divalent reactive substituent and $X_1$, $X_2$, $X_3$ and $X_4$ have the meanings given in Formula I, with two equivalents of a non-ionogenically substituted or condensed primary phenylamine.

As monovalent reactive substituents, $Y_1$, $Y_2$ and $Y_3$ each preferably represents chlorine, an etherified hydroxy group, for instance an alkoxy group such as methoxy or ethoxy group, or an aryloxy group, such as phenoxy, methylphenoxy or chlorophenoxy group, or a tertiary amino group, in which case, preferably the morpholino group.

If $Y_1$ and $Y_2$ together represent a divalent reactive substituent then this is preferably an imino group of the formula =N—R'; in this case $Y_3$ is advantageously an amino group of the formula —NH—R'. In these formulae, R' represents hydrogen or an alkyl group optionally containing non-ionogenic substituents, e.g. the methyl, ethyl, butyl, γ-methoxypropyl or β-hydroxyethyl group; preferably R' is hydrogen. As indicated above, isoindolines of this type can occur in tautomeric form; the tautomeric structures are also embraced by the drawing of a structural formula.

Starting materials of Formula II wherein $Y_1$, $Y_2$ and $Y_3$ each represents chlorine are obtained by reacting tetrachloro- or tetrabromophthalimide with phosphorus pentachloride; if tetrabromophthalimide is used, then individual bromine atoms can be exchanged for chlorine atoms. By reacting this 1,3,3-trichloro-isoindoline compound of Formula II with an alkali metal alcoholate or phenolate or with a secondary amine, starting materials of the Formula II are obtained wherein $Y_1$, $Y_2$ and $Y_3$ each represent an etherified hydroxy group or tertiary amino group. If a 1,3,3-trichloro-isoindoline compound of Formula II is reacted with an amine of the formula R'—$NH_2$, then starting materials of Formula II are obtained wherein $Y_1$ and $Y_2$ together represent the amino group of the formula =N—R' and $Y_3$ represents the amino group of the formula —NH—R'.

The reaction of non-ionogenically substituted or condensed primary phenylamines with a compound of Formula II wherein each of $Y_1$, $Y_2$ and $Y_3$ is chlorine, is preferably performed by heating the two starting substances in the absence of compounds containing hydroxyl groups, advantageously to temperatures of 50 to 250° C., whereby generally the hydrogen chloride which is split off is released from the reaction mixture. Advantageously the reaction partners are reacted in an inert solvent, e.g. in an optionally halogenated or nitrated hydrocarbon. Instead of allowing the hydrogen chloride to escape, it can be bound with suitable acid binding agents, e.g. by means of an excess of the phenylamine to be reacted or by means of a tertiary amine such as triethylamine, N,N-diethyl-aniline or pyridine; in this case the reaction can be performed at room temperature. The word "low" as used in this specification and in the appended claims in connection with "alkyl" and "alkoxy" means that those radicals have from 1 to 5 carbon atoms, in connection with "alkanoyl" it means a radical of from 2 to 5 carbon atoms.

The reaction of a non-ionogenically substituted or condensed primary phenylamine with a compound of Formula II wherein $Y_1$ and $Y_2$ together are =N—R', preferably =NH, and $Y_3$ is —NH—R', especially —$NH_2$, is advantageously performed by heating the reaction partners in an organic solvent. As organic solvents, optionally halogenated or nitrated aromatic hydrocarbons, higher boiling alcohols, e.g. benzyl alcohol or ethylene glycol and its monoether can be used; particularly suitable solvents are fatty acids such as glacial acetic acid.

Compounds of the Formula II wherein each of $Y_1$, $Y_2$ and $Y_3$ is an etherified hydroxy group or tertiary amino group are advantageously reacted with the non-ionogenically substituted or condensed phenylamine in the presence of an organic acid, especially in acetic acid. This reaction occurs even in water.

In all these modifications of the process, the crude pigments generally precipitate while the reaction mixture is hot and, by filtering off and, optionally, by washing with organic solvents, they can be isolated in a pure form suitable for analysis.

In general, the pigments usable according to the invention have a good texture and in most cases can be used as crude products. If necessary or desirable, the crude products can be converted by milling or kneading into a finely dispersed form. For this purpose, advantageously milling auxiliaries are used such as inorganic and/or organic salts in the presence or absence of organic solvents. Often, an improvement of the properties can also be attained by heating the crude pigments in hot organic solvents. After milling, the auxiliaries are removed in the usual way, soluble inorganic salts, e.g. with water, and water-insoluble organic auxiliaries, e.g. by steam distillation.

Pigments usable according to the invention are particularly suitable for the colouring of vinyl, polyolefin and styrene polymers such as polymeric materials, and so-called film formers or binders known as crude materials for lacquers, particularly linseed oil varnish, nitrocellulose, alkyd resins, melamine resins and urea-formaldehyde resins. The high molecular organic substances are pigmented with the pigments of Formula I, for example, by mixing such a pigment, optionally in the form of master batches, with these substrata using sets of mixing rollers, mixing or milling apparatus. The pigmented material is then made into the desired final form by the usual known processes such as calandering, pressing, extrusion, spreading, pouring or injection moulding. To produce non-rigid articles or to reduce their brittleness, it is often desirable to incorporate so-called plasticisers into the high molecular compounds before forming. Esters of phosphoric acid, phthalic acid or sebasic acid, for example, can serve as such. The plasticiser can be incorporated into the polymeric materials before or after incorporation of the pigment dyestuff in the process according to the invention. To attain various shades, it is also possible to add fillers or other colour-imparting components such as white, coloured or black pigments, in any amounts desired, to the high molecular organic substances in addition to the compounds of Formula I.

To pigment lacquers and printing inks, the high molecular organic materials and the compounds of Formula I, optionally together with additives such as fillers, other pigments, siccatives or plasticisers, are finely dispersed or dissolved in a common organic solvent or mixture of solvents. This can be done by dispersing or dissolving the individual components separately or dispersing or dissolving several of them together and then bringing all components together.

High molecular organic materials pigmented according to the invention generally contain amounts of 0.001 to 30% by weight of a compound of Formula I, calculated on the high molecular organic substance to be pigmented; polymeric materials and lacquers preferably contain 0.1 to 5% by weight, printing inks preferably contain 10 to 30% by weight. The amount of pigment to be chosen depends in the first place on the desired colour strength, then on the thickness of the article and finally on any content of white pigment there may be in the polymeric material.

High molecular organic substances pigmented according to the invention have very fast greenish yellow, yellow, yellowish red, reddish yellow, orange, red, blueish red or brown shades; also the fastness properties in use are generally very good.

The following non-limitative examples illustrate the invention further. The temperatures are given therein in degrees centigrade. Percentages are given by weight unless expressly stated otherwise.

Example 1

6.9 g. of 1,3,3-trimethoxy-4,5,6,7-tetrachloroisoindolenine and 9.9 g. of 4-chlorobenzoic acid-(3'-aminophenylamide) in 200 g. of glacial acetic acid are brought to the boil within 5 minutes while stirring well. At first a colourless solution is formed which, on heating, quickly turns yellow. The yellow dyestuff begins to precipitate at 60°. It is boiled for another 5 minutes and then filtered off at boiling temperature. The greenish yellow dyestuff is washed with alcohol and then with acetone and dried. The yield is 12.8 g. The pigment has good fastness to cross lacquering, migration and light, and corresponds to the formula

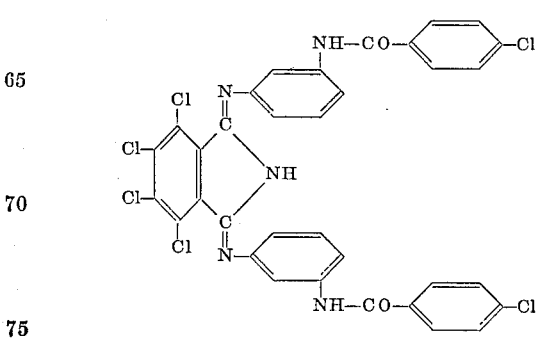

The same pigment is obtained if, instead of 6.9 g. of 1,3,3-trimethoxy-4,5,6,7-tetrachloroisoindolenine, 10.2 g. of 1,3,3-trimorpholino-4,5,6,7-tetrachloroisoindolenine or 5.6 g. of 1-amino-3-imino-4,5,6,7-tetrachloroisoindolenine are used.

If the 9.9 g. of 4-chlorobenzoic acid-(3'-aminophenylamide) are replaced by equimolar amounts of one of the amines given in the following Table I, column II, then with otherwise the same procedure, pigments are obtained which have similarly good fastness properties.

TABLE I

| Expl. No. | Amine | Shade of print on paper |
|---|---|---|
| 2 | 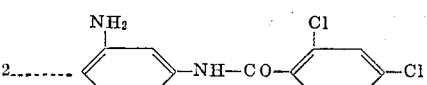 | Greenish yellow. |
| 3 | 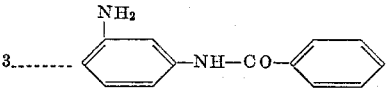 | Do. |
| 4 | 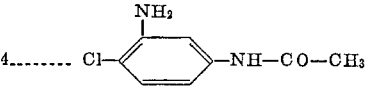 | Reddish yellow. |
| 5 | 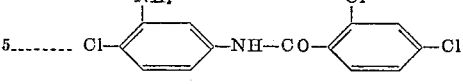 | Do. |
| 6 | 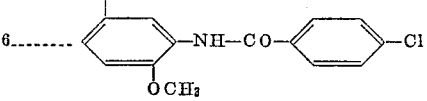 | Do. |
| 7 | 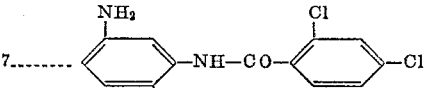 | Do. |
| 8 | 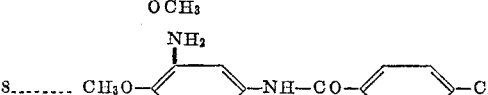 | Do. |
| 9 | 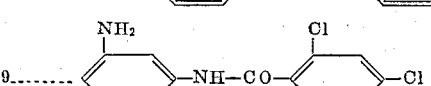 | Do. |
| 10 | 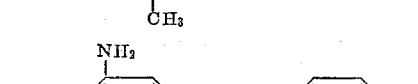 | Do. |
| 11 |  | Do. |
| 12 | 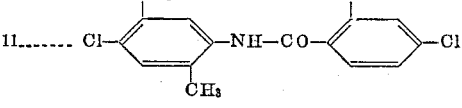 | Do. |
| 13 | 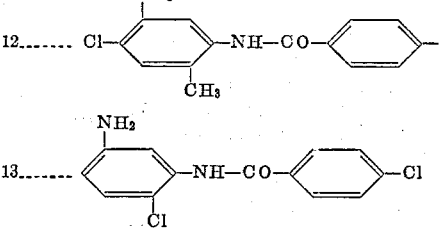 | Do. |

TABLE 1—Continued

| Expl. No. | Amine | Shade of print on paper |
|---|---|---|
| 14 | 4-amino-2-chloro-phenyl-(2-chloro-benzamide) [NH₂, Cl on aniline; NH-CO-C₆H₃Cl₂] | Do. |
| 15 | 4-amino-phenyl-(4-chloro-benzamide) | Do. |
| 16 | 4-amino-phenyl-N'-(2-chloro-phenyl)-urea | Do. |
| 17 | 4-amino-phenyl-carbamic acid methyl ester (NH—CO—O—CH₃) | Do. |
| 18 | 4-amino-phenyl-urea (NH—CO—NH₂) | Yellow. |
| 19 | 4-amino-phenyl-N'-ethyl-urea (NH—CO—NH—C₂H₅) | Do. |
| 20 | 4-amino-phenyl-N'-phenyl-urea | Do. |
| 21 | 4-amino-phenyl-N'-(4-methyl-phenyl)-urea | Do. |
| 22 | 4-amino-phenyl-N'-(2-methoxy-phenyl)-urea | Do. |
| 23 | 4-amino-phenyl-N'-(2,4-dibromo-phenyl)-urea | Do. |
| 24 | NH₂—⟨phenyl with O-(3-methylphenyl)⟩—NH—CO—⟨phenyl⟩—OCH₃ | Do. |
| 25 | NH₂—⟨phenyl with O-(4-bromophenyl)⟩—NH—CO—⟨phenyl⟩—CH₃ | Do. |
| 26 | Cl—⟨phenyl⟩—O—⟨phenyl with NH₂⟩—NH—CO—⟨phenyl⟩—Br | Do. |

Example 27

12.44 g. of 4-chlorobenzoic acid-(2'-chloro-4'-amino-5'-methoxyphenylamide) are heated to 80° in 320 g. of glacial acetic acid. 6.9 g. of 1,3,3-trimethoxy - 4,5,6,7- tetrachloroisoindolenine are added all at once while stirring well and the whole is then boiled for 5 minutes. The precipitated red pigment is filtered off hot and washed with alcohol and then with acetone and dried. The yield is 16.7 g. The red pigment of the formula given below, has good fastness to cross lacquering, migration and light.

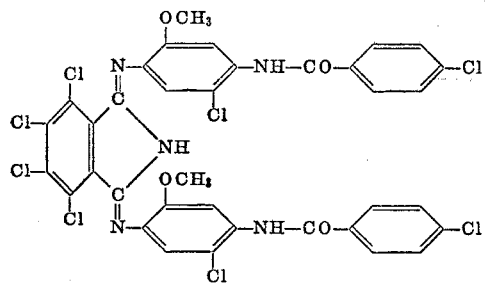

Example 28

10.2 g. of 1,3,3-trimorpholino - 4,5,6,7-tetrachloroisoindolenine and 12.3 g. of 4-chlorobenzoic acid-(2,5'-dimethoxy-4'-aminophenylamide) are boiled for 15 minutes in 300 g. of glacial acetic acid while stirring vigorously. The precipitated red pigment is filtered off while still hot, washed with ethanol and then with acetone and dried. The blueish red pigment of the formula

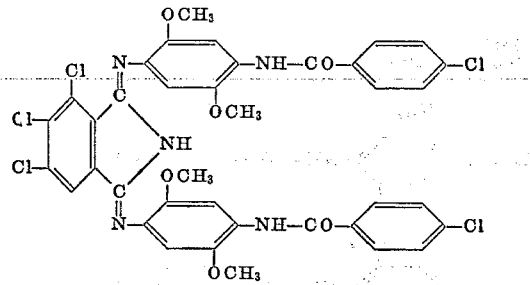

is fast to cross lacquering, migration and light.

If instead of 12.3 g. of 4-chlorobenzoic acid-(2',5'-dimethoxy - 4'-aminophenylamide), equimolar amounts of an amine given in Table II is used and otherwise the procedure given in Example 28 is followed, then similarly good pigments are obtained which have the shades given in column III of Table II.

TABLE II

| I Expl. No. | II Amine | III Shade of print on paper |
|---|---|---|
| 29 | NH₂—⟨CH₃O, Cl⟩—NH—CO—⟨Cl⟩ | Blueish red. |
| 30 | NH₂—⟨CH₃O, Cl⟩—NH—CO—⟨Cl, Cl⟩ | Yellowish red. |
| 31 | NH₂—⟨O-phenyl, Cl⟩—NH—CO—⟨Cl⟩ | Do. |
| 32 | NH₂—⟨Cl, Cl⟩—NH—CO—⟨phenyl⟩ | Orange. |
| 33 | NH₂—⟨Cl, Cl⟩—NH—CO—⟨Cl⟩ | Do. |
| 34 | NH₂—⟨Cl, Cl⟩—NH—CO—⟨Cl, Cl⟩ | Do. |
| 35 | NH₂—⟨Cl, Cl⟩—NH—CO—⟨Cl⟩ | Do. |
| 36 | NH₂—⟨OCH₃⟩—NH—CO—⟨Cl⟩ | Yellowish red. |
| 37 | NH₂—⟨OCH₃⟩—NH—CO—⟨Cl, Cl⟩ | Do. |

TABLE II—Continued

| Expl. No. | Amine | Shade of print on paper |
|---|---|---|
| 38 | NH₂—C₆H₃(Br)—NH—CO—C₆H₄—Cl | Reddish yellow. |
| 39 | NH₂—C₆H₃(Cl)—NH—CO—C₆H₄—Cl | Do. |
| 40 | NH₂—C₆H₃(Cl)—NH—CO—C₆H₃(Cl)—Cl | Do. |
| 41 | NH₂—C₆H₃(CH₃)—NH—CO—C₆H₄—Cl | Do. |
| 42 | NH₂—C₆H₃(CH₃)—NH—CO—C₆H₃(Cl)—Cl | Do. |
| 43 | NH₂—C₆H₂(OCH₃)(OCH₃)—NH—CO—CH₃ | Orange. |
| 44 | NH₂—C₆H₂(OC₂H₅)(OC₂H₅)—NH—CO—C₆H₅ | Reddish brown. |
| 45 | NH₂—C₆H₂(CH₃O)(CH₃)—NH—CO—C₆H₅ | Yellowish brown. |
| 46 | NH₂—C₆H₂(Cl)(OCH₃)—NH—CO—C₆H₄—Cl | Yellowish red. |
| 47 | NH₂—C₆H₂(Cl)(OCH₃)—NH—CO—C₆H₄(Cl) | Orange. |
| 48 | NH₂—C₆H₂(Cl)(OCH₃)—NH—CO—C₆H₃(Cl)—Cl | Do. |
| 49 | NH₂—C₆H₂(Cl)(Cl)—NH—CO—C₆H₃(Cl)—Cl | Reddish yellow. |
| 50 | NH₂—C₆H₄—NH—CO—C₆H₄—Cl | Do. |
| 51 | NH₂—C₆H₃(Cl)—NH—CO—C₆H₃(Cl)—Cl | Do. |

Example 52

18 g. of 1,3,3,4,5,6,7-heptachloroisoindolenine and 23.8 g. of 4-phthaloylamino-1-aminobenzene, produced by condensation of phthalic acid anhydride with 4-nitroaniline and subsequent reduction of the nitro group, are heated in 300 g. of 1,2-dichlorobenzene for 20 minutes at 150°. The precipitated yellow dye-stuff is filtered off while still hot, washed with ethanol and then with acetone and dried. In this way, 32 g. of a reddish yellow pigment of the following formula are obtained. The pigment has very good fastness to cross lacquering, migration and light.

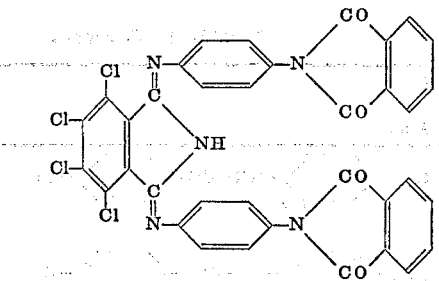

If the 23.8 g. of 4-phthaloylamino-1-aminobenzene are replaced by equimolar amounts of one of the amines given in the following Table III, then with otherwise the same procedure, similar fast pigments are obtained which have the shades given in column III.

TABLE III

| I Expl. No. | II Amine | III Shade in PVC sheets |
|---|---|---|
| 53 | | Yellow. |
| 54 | | Reddish yellow. |
| 55 | | Do. |
| 56 | | Yellow. |
| 57 | | Do. |
| 58 | | Reddish yellow. |
| 59 | | Orange. |
| 60 | | Do. |
| 61 | | Do. |

TABLE III—Continued

| Expl. No. | Amine | Shade in PVC sheets |
|---|---|---|
| 62 | H₂N—⟨benzene⟩—⟨benzene⟩—N(CO)₂⟨benzene⟩ | Yellowish orange. |
| 63 | H₂N—⟨benzene-CH₃,CH₃⟩—⟨benzene⟩—N(CO)₂⟨benzene-Cl₄⟩ | Do. |
| 64 | H₂N—⟨benzene-OCH₃,OCH₃⟩—⟨benzene⟩—N(CO)₂⟨benzene-Cl₄⟩ | Orange. |
| 65 | H₂N—⟨benzene-Cl,Cl⟩—⟨benzene⟩—N(CO)₂⟨benzene⟩ | Do. |

Example 66

5.47 g. of a 1,3,3-trichloro-4,5,6,7-tetrahalogenoisoindolenine, the halogen atoms of which consist of a mixture of chlorine and bromine, and 4.08 g. of 2-chloro-5-aminobenzoic acid amide in 150 g. of glacial acetic acid are boiled for 5 minutes. The precipitated yellow dyestuff is filtered off, washed with ethanol and then with acetone and dried. 6.5 g. of a yellow pigment are so obtained which has very good fastness to light and solvents.

The 1,3,3-trichloro-4,5,6,7-tetrahalogenoisoindolenine is produced by reaction of tetrabromophthalimide and 2 mols of phosphorus pentachloride in boiling phosphorus oxychloride. In this way about 20% (molar) of the bromine atoms are replaced by chlorine atoms.

Yellow pigments having similarly good properties are obtained if the 4.08 g. of 2-chloro-5-aminobenzoic acid amide is replaced by equimolar amounts of 4-phthaloyl-amino- 1 - aminobenzene or 4-chlorobenzoic acid-(3'-amino-phenylamide).

Example 67

1 g. of 1,3-bis-(4'-phthaloylaminophenylimino)-4,5,6,7-tetrachloroisoindoline (produced according to Example 52) and 5 g. of titanium dioxide are added to 100 g. of an annealing lacquer consisting of 58.5 g. of a 60% solution of an alkyl resin of coconut oil in xylene, 23 g. of a 65% melamine resin lacquer in butanol, 17 g. of xylene and 1.5 g. of butanol. The mixture is milled for 48 hours in a ball mill and the lacquer so pigmented is sprayed onto cleansed metal surfaces. After annealing at 120° a reddish yellow colour is obtained which has good fastness to light and cross lacquering.

Example 68

4 g. of 1,3-bis-[4'-(3",4",5",6"-tetrachlorophthaloylamino) - phenylimino]-4,5,6,7-tetrachloroisoindoline (produced according to Example 54), 35 g. of a 60% solution of an alkyd resin, modified with urea/formaldehyde, in xylene/butanol 1:1, 10 g. of terpentine oil and 5 g. of xylene are milled for 48 hours in a ball mill. After spraying the coloured lacquer formed onto an aluminum sheet and annealing at 120°, a reddish yellow coating having very good fastness to light, heat and cross lacquering is obtained.

Example 69

80 g. of an unsaturated liquid polyester resin, 19.72 g. of monostyrene and 0.28 g. of a cobalt siccative containing 16% cobalt, and 1 g. of 1,3-bis-[2',5'-dichloro-4'-(4"-chlorobenzoylamino)-phenylimino] - 4,5,6,7 - tetrachloroisoindoline (produced according to Example 33) and 5 g. of titanium dioxide (Rutile) are milled for 48 hours in a ball mill. Shortly before using this lacquer, a mixture consisting of 4.15 g. of cumene hydrogen peroxide (70%), 2.52 g. of ethyl acetate and 13.33 g. of butyl acetate is added. After painting this mixture onto cardboard and drying in the air, an orange coloured coating having very good fastness to light, heat and cross lacquering is obtained.

Example 70

24.5 g. of an unesterified epoxy resin, 10.5 g. of an oil-reactive alkylphenol resin, 35 g. of xylene and 30 g. of diacetone alcohol are worked up into a lacquer which is then milled for 24 hours in a ball mill with 4 g. of 1,3 - bis - [4'-methyl-3'-(4"-chlorobenzoylamino)-phenylimino]-4,5,6,7-tetrachloroisoindoline (produced according to Example 10). After spraying onto aluminum sheets and annealing at 120°, reddish yellow coatings having very good fastness to heat, cross lacquering and light are obtained.

Example 71

0.2 g. of the pigment produced according to Example 39 by condensation of 1,3,3-trimorpholino-4,5,6,7-tetrachloroisoindolenine and 4-chlorobenzoic acid-(2'-chloro-4'-aminophenylamide), 1 g. of titanium dioxide (Rutile) and 100 g. of polyethylene granulate are mixed in a drum and then the mixture is worked up on a set of 130° hot mixing rollers. The mass is pressed into sheets while hot or is formed in the extruder. The sheets have a beautiful reddish yellow shade which has good fastness to light.

Example 72

50 g. of the pigment produced (Example 40) by condensation of 1,3,3 - trimopholino - 4,5,6,7 - tetrachloroisoindolenine and 2,4-dichlorobenzoic acid - (2' - chloro - 4'-aminophenylamide), finely distributed by milling with sand, and 12.5 g. of the sodium salt of the condensation product of napthalene-2-sulphonic acid with formaldehyde, 0.5 g. of sodium hydroxide and 200 g. of water are milled in a ball mill for 72 hours. 5 g. of this paste are added to 2000 g. of a sodium xanthogenate solution, produced from 180 g. of cellulose, 180 g. of sodium hydroxide, 640 g. of carbon disulphide and 1000 g. of water, and the suspension is homogenised by stirring. After standing for 12 hours under vacuum the viscose is spun in the usual way, desulphurised, washed, brightened and dried. Pure reddish yellow fibers are obtained the colour of which has good wet and light fastness properties.

Example 73

0.1 g. of the pigment produced according to Example 39 by condensation of 1,3,3-trimorpholino-4,5,6,7-tetrachloroisoindolenine and 4-chlorobenzoic acid-(2'-chloro-4'-aminophenylamide), 0.5 g. of titanium dioxide (Rutile) and 100 g. of polypropylene granulate are mixed in a drum and the mixture is then worked up on a set of 130° hot mixing rollers until a homogeneously coloured mixture is attained. The mass is pressed while hot into sheets of 1 mm. thickness. The sheets have a beautiful reddish yellow colour which has good fastness to light.

We claim:
1. A pigment of the formula

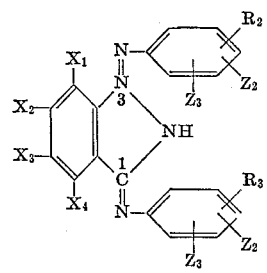

wherein each of $X_1$, $X_2$, $X_3$ and $X_4$ is a member selected from the group consisting of chlorine and bromine,
$R_2$ is lower alkanoylamino, lower alkoxycarbonylamino, benzoylamino, chloro - benzoylamino, bromo - benzoylamino, lower alkyl - benzoylamino, lower alkoxy - benzoylamino, phthalimido, chlorophthalimido, a phthalimido - phenyl radical any substituent of which is selected from chlorine, lower alkyl and lower alkoxy, succinimido, pyridine-dicarboximido, ureido, N-lower alkyl-ureido, an N-phenyl-ureido radical optionally substituted at the phenyl moiety, any substituent of the latter being selected from chlorine, bromine, lower alkyl and lower alkoxy,
$Z_2$ is hydrogen, chlorine, bromine, lower alkyl, lower alkoxy, phenoxy, chlorophenoxy, bromophenoxy and lower alkyl-phenoxy, and
$Z_3$ is hydrogen, chlorine and lower alkoxy.

2. A pigment as defined in claim 1, wherein each of $X_1$ through $X_4$ represents chlorine and each of the carbon atoms in 1- and 3-position of the isoindoline nucleus is substituted by the grouping

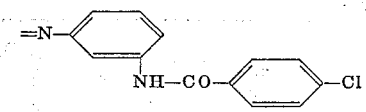

3. A pigment as defined in claim 1, wherein each of $X_1$ through $X_4$ represents chlorine and each of the carbon atoms in 1- and 3-position of the isoindoline nucleus is substituted by the grouping

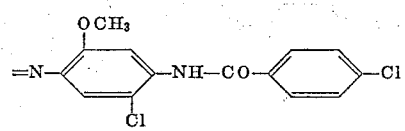

4. A pigment as defined in claim 1, wherein each of $X_1$ through $X_4$ represents chlorine and each of the carbon atoms in 1- and 3-position of the isoindoline nucleus is substituted by the grouping

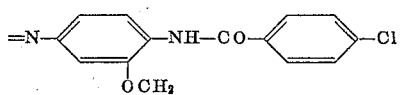

5. A pigment as defined in claim 1, wherein each of $X_1$ through $X_4$ represents chlorine and each of the carbon atoms in 1- and 3-position of the isoindoline nucleus is substituted by the grouping

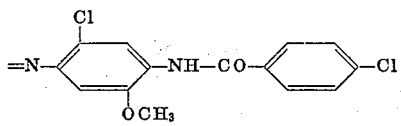

6. A pigment as defined in claim 1, wherein each of $X_1$ through $X_4$ represents chlorine and each of the carbon atoms in 1- and 3-position of the isoindoline nucleus is substituted by the grouping

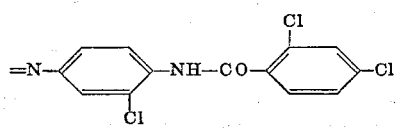

References Cited

UNITED STATES PATENTS 2,739,155   3/1956   Rosch et al. _____ 260—326.1

ALEX MAZEL, Primary Examiner

J. A. NARCAVAGE, Assistant Examiner

U.S. Cl. X.R.

106—23, 164, 241, 266; 260—37, 38, 39, 40, 41, 41.5, 239.6, 247.5, 295, 314.5, 326, 764